United States Patent
Sachs et al.

(10) Patent No.: US 9,348,836 B2
(45) Date of Patent: *May 24, 2016

(54) DETERMINING A PREFERRED MODIFIED VERSION FROM AMONG MULTIPLE MODIFIED VERSIONS FOR SYNCHRONIZED FILES

(71) Applicant: Dropbox, Inc., San Francisco, CA (US)

(72) Inventors: Robert R. Sachs, San Francisco, CA (US); Robin W. Reasoner, Orinda, CA (US); Adam Avrunin, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,148

(22) Filed: Jan. 23, 2015

(65) Prior Publication Data

US 2015/0134614 A1 May 14, 2015

Related U.S. Application Data

(63) Continuation of application No. 13/931,356, filed on Jun. 28, 2013, now Pat. No. 8,996,457, which is a continuation of application No. 13/535,248, filed on Jun. 27, 2012, now Pat. No. 8,504,519.

(51) Int. Cl.
*G06F 17/30* (2006.01)
*G06F 9/44* (2006.01)

(52) U.S. Cl.
CPC ............ *G06F 17/30174* (2013.01); *G06F 8/71* (2013.01); *G06F 17/30165* (2013.01); *G06F 17/30283* (2013.01); *G06F 17/30575* (2013.01)

(58) Field of Classification Search
CPC .................... G06F 17/30174; G06F 17/30283; G06F 17/30165; G06F 17/30575; G06F 8/71
See application file for complete search history.

(56) References Cited

U.S. PATENT DOCUMENTS

| 7,228,319 B1 | 6/2007 | Fuchs |
| 7,353,227 B2 | 4/2008 | Wu |

(Continued)

FOREIGN PATENT DOCUMENTS

| CN | 1804836 A | 7/2006 |
| CN | 102457549 A | 5/2012 |

(Continued)

OTHER PUBLICATIONS

Chinese Fourth Office Action, Chinese Application No. 201310261590.9, Jul. 1, 2015, 8 pages.

(Continued)

*Primary Examiner* — Leslie Wong
(74) *Attorney, Agent, or Firm* — Fenwick & West LLP

(57) ABSTRACT

A server stores files and manages the synchronization of those files across client devices in accordance with user preferences that may be embodied in change management rules. A first version of a file has been designated to be synchronized across at least a first client and a second client. The first client accesses the first version of the file and creates a first modified version of the file, and the second client accesses the first version of the file and creates a second modified version of the file. When the first and second clients attempt to re-synchronize their respective modified versions of the file, the server determines a preferred version from among the available modified versions of the file according to change management rules. Then, the preferred version is stored by the server and is subsequently served for synchronization across the client devices.

21 Claims, 2 Drawing Sheets

(56) References Cited

U.S. PATENT DOCUMENTS

| | | | |
|---|---|---|---|
| 7,949,938 B2 | 5/2011 | Champion et al. | |
| 8,117,344 B2 * | 2/2012 | Mendez et al. | 709/248 |
| 8,229,579 B2 | 7/2012 | Eldridge et al. | |
| 8,489,549 B2 * | 7/2013 | Guarraci | 707/612 |
| 8,504,519 B1 | 8/2013 | Sachs et al. | |
| 2006/0020359 A1 | 1/2006 | Wu | |
| 2006/0020570 A1 | 1/2006 | Wu | |
| 2006/0161516 A1 | 7/2006 | Clarke et al. | |
| 2007/0067373 A1 | 3/2007 | Higgins et al. | |
| 2010/0174731 A1 | 7/2010 | Vermeulen et al. | |
| 2011/0072059 A1 | 3/2011 | Guarraci | |
| 2011/0106795 A1 | 5/2011 | Maim | |
| 2011/0264768 A1 | 10/2011 | Walker et al. | |
| 2012/0016899 A1 | 1/2012 | Kumar et al. | |
| 2012/0047239 A1 | 2/2012 | Donahue et al. | |
| 2012/0084188 A1 | 4/2012 | Zuber | |
| 2012/0166516 A1 | 6/2012 | Simmons et al. | |
| 2012/0310762 A1 * | 12/2012 | Robbin et al. | 705/26.1 |
| 2013/0124638 A1 * | 5/2013 | Barreto et al. | 709/205 |
| 2013/0191339 A1 * | 7/2013 | Haden et al. | 707/638 |

FOREIGN PATENT DOCUMENTS

| | | |
|---|---|---|
| JP | H06-324928 A | 11/1994 |
| JP | 2006-195972 A | 7/2006 |

OTHER PUBLICATIONS

European Examination Report, European Application No. 13174051.6, Jul. 17, 2015, 8 pages.

European Extended Search Report, European Application No. 13174051.6, Sep. 18, 2013, 7 pages, in U.S. Appl. No. 13/931,356.

U.S. Appl. No. 13/217,944, filed Aug. 25, 2011, Inventors A. Ferdowsi et al.

U.S. Appl. No. 12/856,581, filed Aug. 13, 2010, Inventors D. Houston et al.

United States Office Action, U.S. Appl. No. 13/535,248, Feb. 12, 2013, 14 pages.

United States Office Action, U.S. Appl. No. 13/535,248, Aug. 30, 2012, 10 pages.

Chinese First Office Action, Chinese Application No. 201310261590.9, Jun. 17, 2014, 21 pages, in U.S. Appl. No. 13/931,356.

Chinese Second Office Action, Chinese Application No. 201310261590.9, Dec. 1, 2014, 14 pages, in U.S. Appl. No. 13/931,356.

PCT Written Opinion of the International Preliminary Examining Authority, PCT Application No. PCT/US2013/047144, May 21, 2014, 6 pages.

Australian First Examination Report, Australian Application No. 2013280772, Jan. 14, 2015, 3 pages, in U.S. Appl. No. 13/931,356.

United States Office Action, U.S. Appl. No. 13/931,356, Mar. 13, 2014, 6 pages.

Chinese Third Office Action, Chinese Application No. 201310261590.9, Mar. 12, 2015, 16 pages.

Japanese Office Action, Japanese Application No. 2015-520344, Aug. 14, 2015, 4 pages (with concise explanation of relevance).

Japanese Second Office Action, Japanese Application No. 2015-520344, Jan. 7, 2016, 5 pages (with concise explanation of relevance).

European Summons to Attend Oral Proceedings Pursuant to Rule 115(1) EPC, European Application No. 13174051.6, Mar. 8, 2016, 8 pages.

\* cited by examiner

DETERMINING A PREFERRED MODIFIED VERSION FROM AMONG MULTIPLE MODIFIED VERSIONS FOR SYNCHRONIZED FILES

CROSS-REFERENCE TO RELATED APPLICATION

This application is a continuation of U.S. application Ser. No. 13/931,356, filed Jun. 28, 2013, entitled "Determining A Preferred Modified Version From Among Multiple Modified Versions For Synchronized Files," which is a continuation of U.S. application Ser. No. 13/535,248, filed Jun. 27, 2012, entitled "Determining A Preferred Modified Version From Among Multiple Modified Versions For Synchronized Files," which are incorporated herein by reference in their entirety.

TECHNICAL FIELD

The disclosed embodiments relate generally to sharing of data over a network. In particular, the disclosed embodiments are directed to determining a preferred modified version of a file from among multiple modified versions of the file that are attempted to be synchronized.

BACKGROUND

It is now common for an individual to regularly use multiple computers from multiple different locations. A typical user may have a first computer at the office and a second computer at home, for example, as well as a portable computer, and a web-enabled mobile device such as a smartphone. To have ready access to the user's content, it is desirable for the user to share files between these multiple computers. Additionally, it is common for a user to want to share files with other users and to enable multiple users to make changes to the files.

One way to share files between multiple computers and multiple users is to transfer the files from one computer to another, for example by emailing a copy of the document from one computer to another. Alternatively, services offer users the opportunity to store their documents "in the cloud"—that is, on servers accessible to users via the Internet or other communication network.

From time to time, users may edit documents to which they have access. When a file is edited in different ways from two different computers at an overlapping period of time or at a time when one or more of the computers is offline, conflicting versions of a file may be created.

SUMMARY

Embodiments of the invention determine a preferred modified version of a file from among multiple modified versions of the file when the multiple modified versions of the file are attempted to be re-synchronized. A server stores files and manages the synchronization of those files across client devices in accordance with user preferences that may be embodied in change management rules. A first version of a file has been designated to be synchronized across at least a first client and a second client. The first client accesses the first version of the file and creates a first modified version of the file, and the second client accesses the first version of the file and creates a second modified version of the file. When the first and second clients attempt to re-synchronize their respective modified versions of the file, the server determines a preferred version from among the available modified versions of the file according to change management rules. Then, the preferred version is stored by the server and is subsequently served for synchronization across the client devices. Any other versions of the file may be saved by the server, may be flagged for subsequent user review, or may be discarded.

Other embodiments include a system and a non-transitory computer-readable storage medium for determining a preferred modified version of a file from among multiple modified versions of the file when the multiple modified versions of the file are attempted to be re-synchronized according to the techniques described above.

The features and advantages described in this specification are not all-inclusive and, in particular, many additional features and advantages will be apparent to one of ordinary skill in the art in view of the drawings, specification, and claims.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Embodiments of the invention determine a preferred modified version of a file from among multiple modified versions of the file when the multiple modified versions of the file are attempted to be re-synchronized. From time to time, a shared file may be edited by more than one client at overlapping times, for example by a single user creating two different versions on two different clients or by two different users with access to the same file creating two different versions. When attempts are made to subsequently re-synchronize the edited versions of the files across the clients via the server, change management rules are applied to determine a preferred edited version of the file from among the edited versions.

Figure 1:
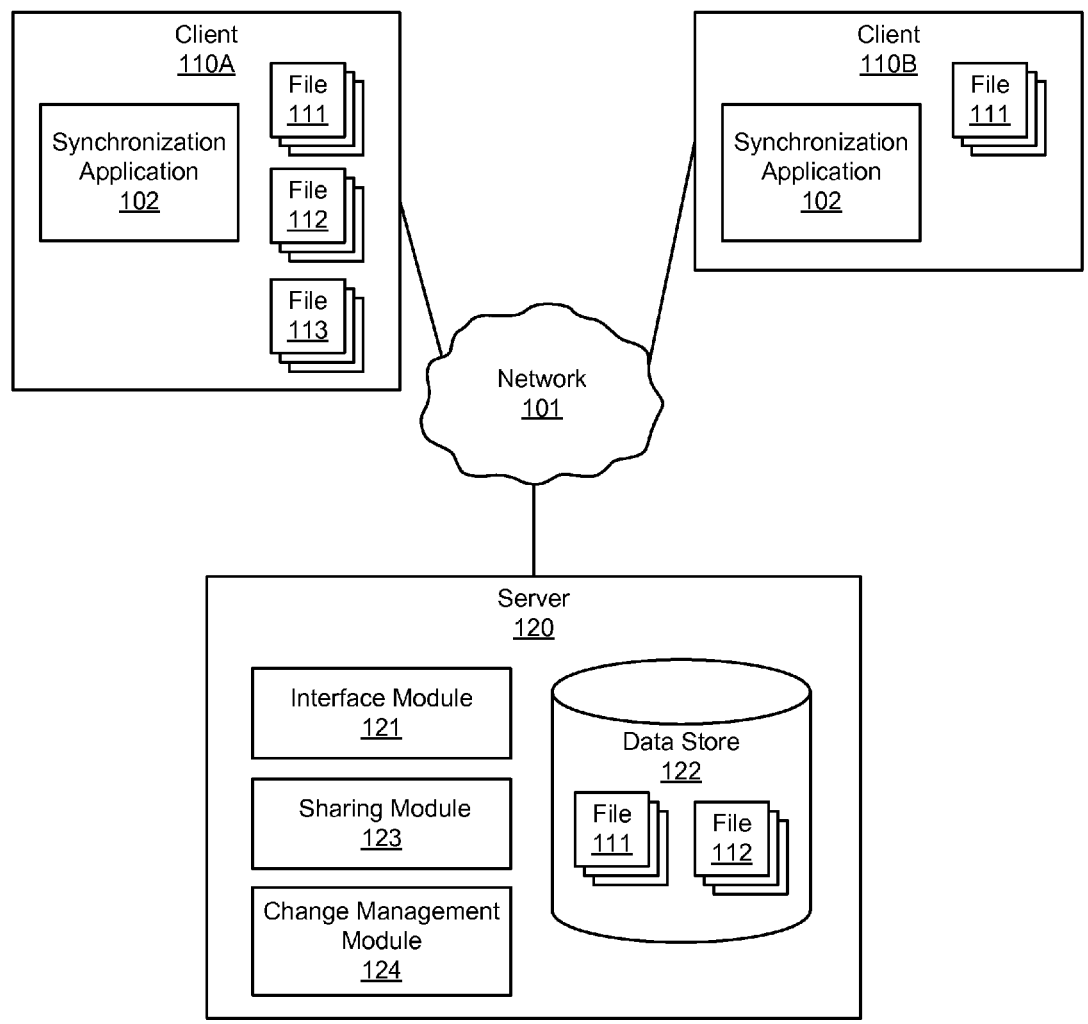
FIG. 1 is a block diagram of a computing environment in which sharing and synchronization of files can be performed, in accordance with an embodiment of the invention.

FIG. 1 illustrates a computing environment in which sharing and synchronization of files can be performed, in accordance with an embodiment of the invention. The computing environment includes a plurality of clients 110A, 110B (collectively 110) and a server 120 connected via a network 101.

Clients 110 add files to server 120 either through a manual upload process, or by synchronization with the local file system. In the embodiment using synchronization, each client 110 executes a synchronization application 102 through which files of that client are specified for synchronization with the server 120. In the example shown in FIG. 1, files 111 and 112 are specified for synchronization with the server 120, whereas file 113 is not. Thus, the synchronization application 102 then provides only the specified files 111 and 112 to the server 120. The synchronized files are typically provided only to clients 110 with which a user has decided to share files. In this example, file 111 of client 110A is specified to be synchronized with client 110B. Thus, the specified file 111 is then provided to client 110B, either by "push" in which the server 120 provides the files to the client 110B, or by "pull" in which the client 110B requests the file 111 from the server 120. The synchronization applications 102 and the server 120 also ensure that changes to the synchronized files are propagated across all associated clients 110 in accordance with change management rules, as will be described below. It is noted that synchronized copies of a user's files may be kept on both the server 120 and the clients 110 among which the file is shared, or the clients 110 may provide a file-browser type interface for manipulating the files as stored on the server 120 without keeping a local copy.

FIG. 1 illustrates only two clients, 110A and 110B, for purposes of clarity. Examples of client devices include a desktop computer, a laptop computer, a tablet computing device, and a handheld computing device such as a personal digital assistant or a smart phone (e.g., an IPHONE or BLACKBERRY, or a SYMBIAN or ANDROID-based smart phone). The clients 110A and 110B may be commonly owned by a single user (such as being the user's desktop computer and the same user's smartphone), or the clients 110A and 110B may be owned by different users. When implemented, the server 120 may be in communication with many clients. In practice, a single user may own several clients between which the user wants to share and sync documents, and/or the user may want to share and sync documents with clients owned by other users. Each client may store one or multiple files on server 120 in any file format. When represented to the user, the files may be arranged in folders; and folders themselves may be arranged in other folders, as determined by the user; however the underlying storage architecture may be considerably different, and implemented to maximize storage efficiency, and without necessarily mirroring each user's file hierarchy. In some implementations, folders may be shared between two or more users. A shared folder originates and is controlled by one user, but it provides access to files in the shared folder to each of the users among whom the folder is shared. Any of the users among whom the folder is shared can make changes to files in it to create modified versions of the files in it. The modified versions of the files are then synced across the clients belonging to the users among whom the folder is shared.

The server 120 stores files and manages the synchronization of those files across client devices in accordance with user preferences embodied in change management rules. The server 120 and its components may be implemented using any appropriate hardware for performing file serving and storage—solely for clarity of illustration and description, FIG. 1 illustrates only a single server, and one instance of relevant file stores and modules. Additionally, many components required for operation of a server, known to those of skill in the art but not germane to this description—for example, network cards, CPUs, memory, and the like—are omitted for clarity. As illustrated in FIG. 1, the server 120 includes an interface module 121, a data store 122, a sharing module 123, and a change management module 124.

The interface module 121 interfaces with clients 110 to facilitate file storage, access, and synchronization between the server 120 and the clients 110, and is one means of implementing this functionality. The interface module 121 receives files from and sends files to clients 110 consistent with the user's preferences for sharing files. The interface module 121 also manages communications with the clients 110 regarding the user's instructions with respect to change management rules, which will be described in greater detail below. The interface module 121 may act as the counterpart on the server 120 to a client-side file-browser style interface that allows a user to manipulate files stored on the server 120. In some embodiments, software executing on the client 110 integrates the network-stored files with the client's local file system to enable a user to manipulate the network-stored files through the same user interface (UI) as is used to manipulate files on the local file system, e.g., via a file explorer. As an alternative to the client-side file-browser interface, the interface module 121 of the server 120 may provide a web interface to a user for manipulating the files stored on the server 120.

The data store 122 stores files submitted to it by clients 110. In the example illustrated in FIG. 1, client 110A has stored files 111 and 112 in the data store 122. Thus, the data store 122 of the server 120 maintains a copy of the files 111 and 112 that may also be present in local storage on the client 110.

The sharing module 123 of the server 120 manages the user's preferences with regard to files to be shared and the users with whom they should be shared. In various embodiments, the user can select a combination of a single file, multiple files within a folder, multiple folders, or multiple files across multiple folders as a file set to be shared and synced. The file sharing also may be accomplished by generating a unique link that unambiguously identifies the file set to which it corresponds, as is described in U.S. patent application Ser. No. 13/217,944 filed Aug. 25, 2011, entitled "File Sharing Via Link Generation," which is incorporated herein by reference in its entirety.

The change management module 124 of the server 120 receives, stores, and applies rules to determine which modified version among a plurality of modified versions of a file is the preferred modified version according to user preferences, and is one means for implementing this functionality. User preferences for determining the preferred modified version may be established in various categories and communicated from a client 110 to the change management module 124 of the server 120 via the interface module 121. Examples of the categories of rules that may be established are as follows. It is noted that one or more types of rules can be established within each category, and combinations of rules within different categories is also possible.

Source Rules.

Rules in this category determine which modified version of the file is preferred based on the source of the version. An exemplary rule within the source category specifies precedence between versions that are modified by different types of client devices (i.e., different sources), such as mobile devices versus desktop devices. For example, a source rule may specify that a version created on a desktop device takes precedence over a version created on a mobile device. Another exemplary rule within the source category specifies precedence between versions that are modified by client devices that are online versus offline during version creation. For example, the rule may specify that a version created on a client device that is online during version creation takes precedence over a version created on a client device that is offline during version creation.

User Rules.

Rules in this category determine which modified version of the file is preferred based on the user that modified the file. An exemplary rule within the user category specifies precedence between versions that are modified by the original author of the file versus other editors. For example, such a rule may specify that a version modified by the original author of the file takes precedence over a version modified by any other user. Another exemplary rule within the user category specifies precedence between versions that are modified by users of a particular class (e.g., supervisors, auditors, quality assurance specialists, members of a particular department) versus versions that are modified by users of another class (e.g., employees, customers, members of another department). For example, the rule may specify that a version modified by a supervisor takes precedence over a version modified by other members of the department that the supervisor leads.

Time Rules.

Rules in this category determine which modified version of the file is preferred based on a respective time at which actions involving the versions of the file occur. An exemplary rule within the time category specifies precedence based on the respective time modifications began to modified versions of the file. For example, the rule may specify that a version having the earliest time at which modifications began takes precedence over versions whose modifications began later. Another exemplary rule within the time category specifies precedence for versions based on the time for each version that the server 120 was notified of the new version's existence. For example, the rule may specify that a version for which the sync process began earlier takes precedence over a version for which the sync process began later.

Quantity Rules.

Rules in this category determine which modified version of the file is preferred based on the quantity of edits in the respective modified versions. An exemplary rule within the quantity category may specify that the version with the most edits takes precedence over versions with fewer edits. Another exemplary rule within the quantity category specifies precedence based on the number of a type of edit, such as the number of additions or deletions, in the respective modified versions. For example, the rule may specify that the version with the most additions (or fewest deletions) takes precedence over other versions.

Locality Rules.

Rules in this category determine which modified version of the file is preferred based on geocoded information associated with the respective modified versions. An exemplary rule within the locality category specifies that a modified version of the file from a predetermined location takes precedence over modified versions of the file from other locations. Another exemplary rule within the locality category specifies precedence of a modified version of the file associated with a location closest to a specified location over modified versions of the file associated with locations further away from the specified location.

Further, the rules maintained in the change management module 124 may also record a user's preferences with regard to treating modified versions of a file that conflict with the version of the file determined to be the preferred version. In some instances, any versions of the file other than the preferred version may be saved by the server (with or without an indication of its status as a non-preferred version), may be flagged for subsequent user review, or may be discarded. In some cases, the server 120 may supply the preferred version and another (non-preferred) version of a file to a conventional file comparison tool in order to identify the differences between them and display them to the user. Examples of such file comparison tools are provided, for example, in U.S. Pat. No. 7,228,319 to Fuchs, entitled "File Comparison of Locally Synched Files," and provided in products such as MICROSOFT WORD, WORKSHARE COMPARE, and other document comparison and redlining software packages where a preferred version of a file is provided as an input to the tool, the preferred version is compared against another input version of the file, and the differences between the preferred version and the other version are output by the tool and may be displayed to the user. The output of the file comparison tool can optionally be stored on the server for future reference by the user.

Alternatively, the server 120 may supply the preferred version and another (non-preferred) version of the file to a conventional edit-merge tool that merges the two versions together, given as inputs the two versions and the indication of which is the preferred version. Exemplary tools in this category include U.S. Pat. No. 7,949,938 to Champion et al., entitled "Comparing and Merging Multiple Documents."

The rules to determine which modified version is the preferred version and the rules for handling the modified versions that conflict with the preferred version may be established as a default across all users and files, or may be established as a result of user preferences set at various levels of granularity. For example, a user may set some rules applicable to all files, other rules applicable only to files of a particular file type or types (such as text files, image files, files associated with a particular software program, etc.), and still other rules applicable to only one or more particular files. Thus, a combination of rules may be applicable to any given file. In addition, the rules may be changed as a user's preferences change. Thus, in various implementations, the change management module 124 of the server 120 enables the users to have maximum flexibility in establishing change management rules to apply to a wide variety of situations in order to govern which version of a plurality of modified versions of the file is the preferred version and govern the treatment of any other versions.

Referring back to FIG. 1, network 101 represents the communication pathways between the clients 110 and the server 120. In one embodiment, the network 101 uses standard Internet communications technologies and/or protocols. Thus, the network 101 can include links using technologies such as Ethernet, IEEE 802.11, IEEE 806.16, WiMAX, 3GPP LTE, integrated services digital network (ISDN), asynchronous transfer mode (ATM), etc. Similarly, the networking protocols used on the network 101 can include the transmission control protocol/Internet protocol (TCP/IP), the hypertext transport protocol (HTTP), the simple mail transfer protocol (SMTP), the file transfer protocol (FTP), etc. The data and files 111-112 exchanged over the network 101 can be represented using any file format, including without limitation a wide variety of text document formats, audio file formats, and image file formats. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
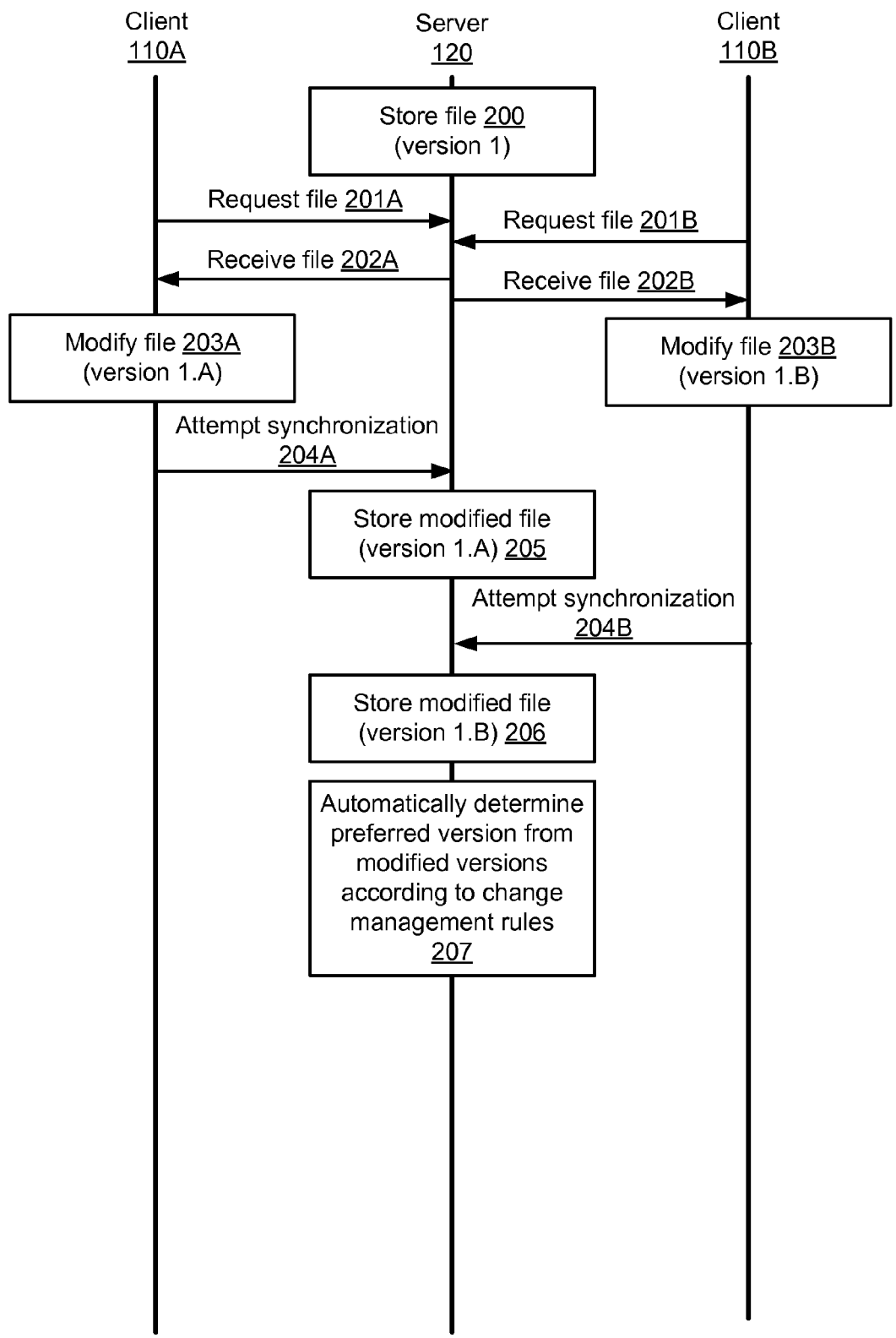
FIG. 2 is an interaction diagram illustrating a method of determining a preferred modified version of a file from among multiple modified versions of the file when clients or the server attempt to sync the multiple modified versions of the file, in accordance with an embodiment of the invention.

FIG. 2 is an interaction diagram illustrating a method of determining a preferred modified version of a file from among multiple modified versions of the file when clients 110 or the server 120 attempt to sync the multiple modified versions of the file, in accordance with an embodiment of the invention. In the scenario illustrated in FIG. 2, in step 200, the server 120 has stored a file to which clients 110A, 110B have access. The file stored at the server 120 at the beginning of this scenario is referred to as version 1. The stored file is a file that has been designated to be synchronized across a first client 110A and a second client 110B.

In step 201A, the first client 110A requests the file from the server 120. In step 202A, the first client 110A receives the file. Likewise, in step 201B, the second client 110B requests the file from the server 120. In step 202B, the second client 110B receives the file. In other implementations, the server 120 may send the most current version of the file to clients 110A, 110B without receiving a request. Each of the clients 110A, 110B stores their received versions locally in their respective storage systems, and thus each has a local copy of the file corresponding to version 1 stored on the server 120.

Then, in step 203A, the first client 110A modifies its local copy of file to create a version referred to herein as version 1.A. In step 203B, the second client 110B also modifies its local copy of the file, but modifies it in a different way to create a version referred to herein as version 1.B. At this point, both clients 110A, 110B have modified version 1 of the file, but they have changed version 1 of the file in different ways, so the copies of the file are no longer synchronized across the server 120 and the clients 110A, 110B. For example, version 1.A may contain additional content, whereas version 1.B may have had certain content removed.

In step 204A, the first client 110A attempts to sync the file with the server 120 by uploading the modified file (version 1.A) to the server 120. Responsive to the attempted synchronization, the server 120 recognizes that the new version 1.A post-dates version 1 of the file, and in step 205, the server 120 stores the modified file (version 1.A) in data store 122. The server 120 may recognize that the new version 1.A is related to version 1 of the file based on the filename, the file metadata (e.g., unique file identifier, last synchronization time, file access history, user identifier, client identifier, etc.), or other information known to those skilled in the art that is conveyed from the client 110A to the server 120 as part of the attempted synchronization. In some implementations, the server 120 continues to store version 1 of the file as well in case a user wants to roll back changes that have been implemented in a file.

At some later point, in step 204B, the second client 110B attempts to sync the file with the server 120 by uploading the modified file (version 1.B) to the server 120. Responsive to the attempted synchronization, the server 120 recognizes that the new version 1.B also post-dates version 1 of the file, and so, in step 206, the server 120 also stores the modified file (version 1.B) in data store 122. Again, the server 120 may recognize that the new version 1.B is related to version 1 in the same way that it earlier recognized that version 1.A was related to version 1. In some implementations, the server 120 continues to maintain version 1 therein. However, because both new versions 1.A and 1.B were created by modifying version 1 (as determined, for example from the respective file metadata), versions 1.A and 1.B are considered to be conflicting modified versions of version 1 of the file.

In step 207, the server automatically determines the preferred version from the available modified versions of the file according to user preferences embodied in change management rules. This determination is made, for example, by the change management module 124 of the server 120 by applying the change management rule set applicable to the users, the file type, and/or the individual file. Unlike conventional redlining or document comparison software that requires the user to specify which version of a file to treat as the preferred version and which version of the file to treat as the non-preferred version, according to an aspect of the invention, the server 120 is able to automatically apply the change management rule set to select the preferred version responsive to the attempted synchronization of multiple versions. Because the change management rule set is user-configurable at various levels of granularity, the convenience of the user is enhanced by not needing to specify on a one-by-one basis after the versions have been created which version should be treated as the preferred version.

Optionally, once the preferred version is determined in step 207, any versions of the file other than the preferred version may be saved by the server 120 (with or without an indication of its status as a non-preferred version), may be flagged for subsequent user review, or may be discarded. As described above, in some cases, the server 120 may supply the preferred version of the file and another modified version of the file to a conventional file comparison tool, in order to identify the differences between the versions of the file, display them to the user, and/or merge the two versions. Regarding the preferred version, the server 120 may mark the preferred updated version (either version 1.A or version 1.B) as the preferred version, may rename the file (for example from version 1 to version 2), and may distribute the preferred version of the file to clients 110A and 110B as well as any other clients with which the file has been shared. Accordingly, the file is again synchronized among the server 120 and clients 110 that share the file.

Additional Configuration Considerations

The disclosure herein has been described in particular detail with respect certain embodiments. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Some portions of the above description describe the systems and methods for synchronizing files in terms of a server-based synchronization architecture. In other embodiments, the synchronization architecture may be client-based instead, with the logic for determining a preferred modified version from among multiple modified versions residing on a client rather than on the server.

Moreover, some portions of the above description describe a server storing modified versions of a file on the server. It is noted that storage of the entire file or modified versions of the file on the server is unnecessary in some embodiments of the invention. For example, a file may be stored by breaking the file into data blocks, storing the data blocks in various locations, and storing the list of locations from which the data blocks can be accessed in order to reconstruct the file. For a modified file, it is possible to only store the changed data blocks and a new list of locations from which the modified file can be reconstructed, rather than storing the unchanged data blocks again. Other examples of methods of data storage and synchronization that can be used in connection with embodiments of the invention are provided in U.S. application Ser. No. 12/856,581, filed Aug. 13, 2010, and entitled "Network Folder Synchronization," which is incorporated herein by reference in its entirety. In yet another embodiment of the invention, versions of the file need not be stored by the server for the server to determine a preferred modified version of the file. In some cases, the user preferences embodied in the change management rules specify that information contained in the metadata of the versions of the files is sufficient from which to determine a preferred modified version from among multiple modified versions. In these circumstances, an entity in the synched file system (either the server 120 or a client 110) can determine a preferred version after receiving notifications of the modified versions including such metadata, rather than requiring the receipt of the modified versions themselves.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A method comprising:
   receiving notification of a first user-modified version of a file at a synchronized file system;
   receiving notification of a second user-modified version of the file at the synchronized file system;
   determining, by a software module of the synchronized file system, a preferred version of the file from among the first and second user-modified versions of the file according to change management rules, wherein the change management rules specify which user-modified version of the file is the preferred version based on at least one respective attribute of the first and second modified versions, wherein the at least one respective attribute is selected from a group consisting of type of client device that generated the versions, geocoded information associated with the versions, quantity of edits in the versions, and file type of the versions, and wherein the other modified version is non-preferred; and
   supplying the preferred version of the file, the non-preferred version of the file, and an indication of the preferred version to an edit-merge tool for merging edits of the two versions to produce an updated version of the user-generated file.

2. The method of claim 1, wherein the change management rules specify a version created on a desktop device is the preferred version and a version created on a mobile device is the non-preferred version.

3. The method of claim 1, wherein the change management rules specify a version created by a client device that is online is the preferred version and a version created by a client device that is offline is the non-preferred version.

4. The method of claim 1, wherein the change management rules specify a version from a predetermined location is the preferred version and a version from another location is the non-preferred version.

5. The method of claim 1, wherein the change management rules specify a version associated with a location closest to a specified location is the preferred version and a version associated with a location further away from the specified location is the non-preferred version.

6. The method of claim 1, wherein the change management rules specify a version with more edits is the preferred version and a version with fewer edits is the non-preferred version.

7. The method of claim 1, wherein the change management rules specify a version with the fewer deletions is the preferred version and a version with more deletions is the non-preferred version.

8. A computer server comprising:
   a computer processor; and
   a non-transitory computer-readable storage medium storing a computer program executable by the computer processor and performing actions comprising:
   receiving notification of a first user-modified version of a file at a synchronized file system;
   receiving notification of a second user-modified version of the file at the synchronized file system;
   determining, by a software module of the synchronized file system, a preferred version of the file from among the first and second user-modified versions of the file according to change management rules, wherein the change management rules specify which user-modified version of the file is the preferred version based on at least one respective attribute of the first and second modified versions, wherein the at least one respective attribute is selected from a group consisting of type of client device that generated the versions, geocoded information associated with the versions, quantity of edits in the versions, and file type of the versions, and wherein the other modified version is non-preferred; and
   supplying the preferred version of the file, the non-preferred version of the file, and an indication of the preferred version to an edit-merge tool for merging edits of the two versions to produce an updated version of the user-generated file.

9. The computer server of claim 8, wherein the change management rules specify a version created on a desktop device is the preferred version and a version created on a mobile device is the non-preferred version.

10. The computer server of claim 8, wherein the change management rules specify a version created by a client device that is online is the preferred version and a version created by a client device that is offline is the non-preferred version.

11. The computer server of claim 8, wherein the change management rules specify a version from a predetermined location is the preferred version and a version from another location is the non-preferred version.

12. The computer server of claim 8, wherein the change management rules specify a version associated with a location closest to a specified location is the preferred version and a version associated with a location further away from the specified location is the non-preferred version.

13. The computer server of claim 8, wherein the change management rules specify a version with more edits is the preferred version and a version with fewer edits is the non-preferred version.

14. The computer server of claim 8, wherein the change management rules specify a version with the fewer deletions is the preferred version and a version with more deletions is the non-preferred version.

15. A non-transitory computer-readable storage medium having executable computer program instructions embodied therein that when executed in a computer system perform actions, comprising:
   receiving notification of a first user-modified version of a file at a synchronized file system;
   receiving notification of a second user-modified version of the file at the synchronized file system;
   determining, by a software module of the synchronized file system, a preferred version of the file from among the first and second user-modified versions of the file according to change management rules, wherein the change management rules specify which user-modified version of the file is the preferred version based on at least one respective attribute of the first and second modified versions, wherein the at least one respective attribute is selected from a group consisting of type of client device that generated the versions, geocoded information associated with the versions, quantity of edits in the versions, and file type of the versions, and wherein the other modified version is non-preferred; and
   supplying the preferred version of the file, the non-preferred version of the file, and an indication of the preferred version to an edit-merge tool for merging edits of the two versions to produce an updated version of the user-generated file.

16. The medium of claim 15, wherein the change management rules specify a version created on a desktop device is the preferred version and a version created on a mobile device is the non-preferred version.

17. The medium of claim 15, wherein the change management rules specify a version created by a client device that is online is the preferred version and a version created by a client device that is offline is the non-preferred version.

18. The medium of claim 15, wherein the change management rules specify a version from a predetermined location is the preferred version and a version from another location is the non-preferred version.

19. The medium of claim 15, wherein the change management rules specify a version associated with a location closest to a specified location is the preferred version and a version associated with a location further away from the specified location.

20. The medium of claim 15, wherein the change management rules specify a version with more edits is the preferred version and a version with fewer edits is the non-preferred version.

21. The medium of claim 15, wherein the change management rules specify a version with the fewer deletions is the preferred version and a version with more deletions is the non-preferred version.

* * * * *